Nov. 25, 1947.  P. S. VILES  2,431,526
RECOVERY OF ISOBUTYLENE
Filed March 13, 1945
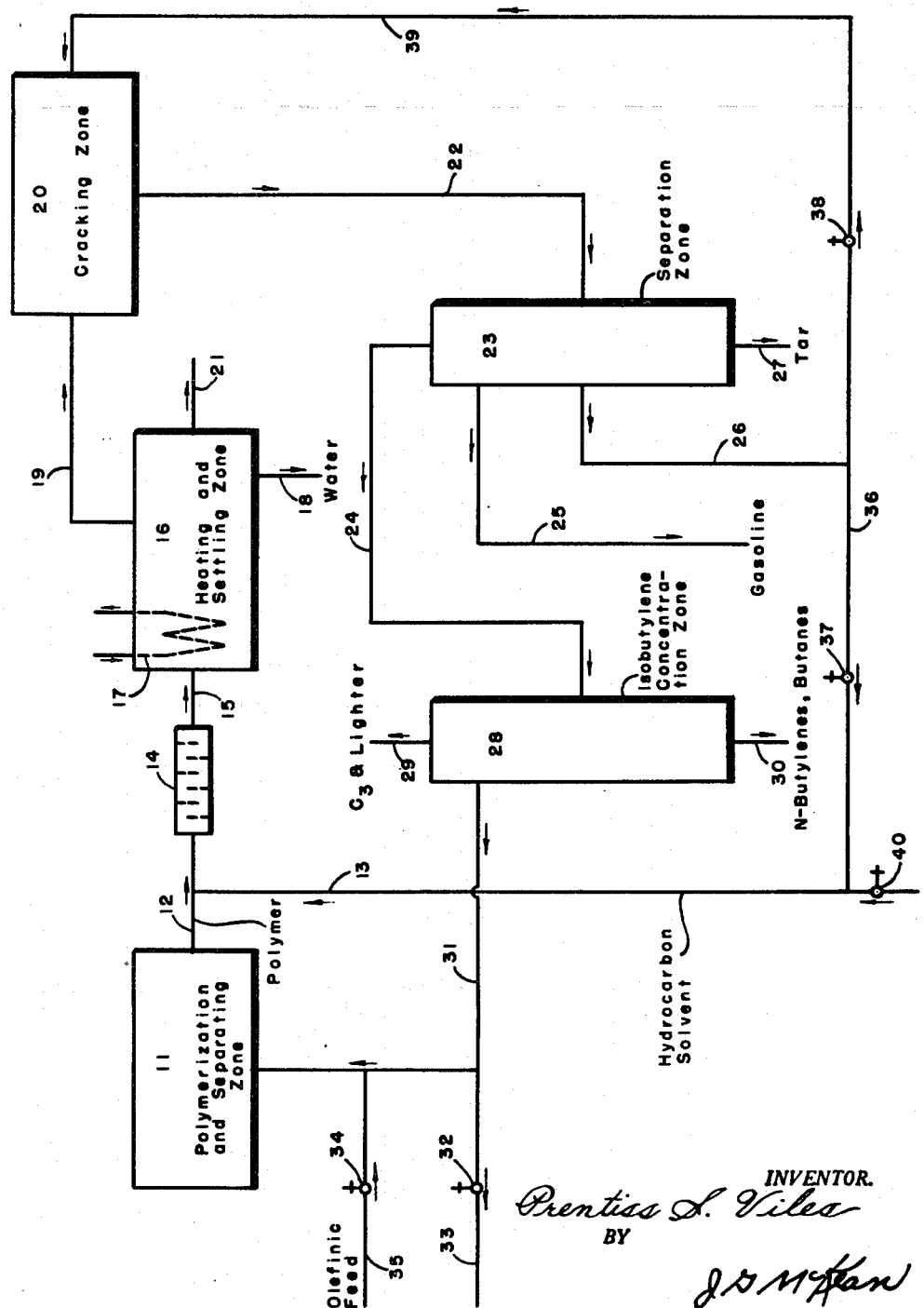
INVENTOR.
Prentiss S. Viles
BY
J. D. McKan
ATTORNEY.

Patented Nov. 25, 1947

2,431,526

UNITED STATES PATENT OFFICE 2,431,526

RECOVERY OF ISOBUTYLENE

Prentiss S. Viles, Goose Creek, Tex., assignor to Standard Oil Development Company, a corporation of Delaware Application March 13, 1945, Serial No. 582,430

4 Claims. (Cl. 260—683)

1

The present invention is concerned with the recovery of isobutylene from its polymers. More particularly, the invention is concerned with the resolution of emulsions of high molecular weight polymers of isobutylene and water and the subsequent treatment of the recovered polymer for production of isobutylene.

In the process known to the industry as the butyl rubber process, a tertiary olefin such as isobutylene and a diolefin such as isoprene or butadiene is copolymerized at low temperatures in the presence of a catalytic agent of the type illustrated by aluminum chloride. It is the practice to employ the catalyst in a solution in an alkyl halide such as methyl chloride. After the polymerization reaction has been terminated and the polymers formed, it is customary to dump the solution containing the polymers into an aqueous medium such as hot water or an alcohol solution for separation of unreacted hydrocarbons and recovery of the polymer.

The polymer produced in accordance with this process is processed in a hot water or alcohol slurry to flash off the solvent and any unreacted hydrocarbon and to serve as a carrying medium for the polymer particles for subsequent processing steps including milling operations. These rubber polymer particles are strained from the water slurry in conventional operations. However, the slurry usually contains an appreciable amount of very small rubber particles and possibly some colloidal rubber fines that pass through the recovery system and ultimately are lost in the water discharged from the operation.

In the various manipulative steps making up a commercial butyl rubber plant there are other sources from which rubber is lost from the system. An example is the system of washing out the reactors and the various other finishing and processing steps. This water with its content of rubber fines ultimately finds its way into the sewage disposal system where the polymer particles become firmly emulsified with the water.

The magnitude of this loss is appreciable as demonstrated by the fact that in the operation of one plant producing a polymer of isobutylene, the amount lost in one day has been as high as 3000 pounds.

While this loss in rubber fines represents a direct loss in the rubber, it also represents a loss in the utilization of the olefinic material making up the synthetic rubber. Furthermore, discarding the material to disposal and sewerage systems ultimately causes contamination of water bodies with resultant destruction of animal life

2 and contamination and fouling of bathing beaches. Burning of the emulsion does not represent a desirable solution since when the material is burned in open pits or stacks, dense black clouds of smoke laden with carbonaceous material are emitted which are objectionable to residential areas adjacent such industrial operations.

In accordance with the present invention the isobutylene contained in the polymer particles discarded into the sewerage system from the so-called butyl rubber plant is recovered and made available for reuse by resolving the emulsion containing the polymer by addition of a liquid hydrocarbon to the emulsion which causes solution of the polymer particles in the hydrocarbon and allows separation of water therefrom. The hydrocarbon solution of polymer is then subjected to cracking conditions where the substantially pure polymer of isobutylene is depolymerized and the product made available for reuse by routing it through various recovery systems well known to the art and ultimately back to the polymerization zone.

The type of hydrocarbon solvent employed is preferably one of an aromatic nature. Heavy naphthas, gas oils, solvent extracts, and the like are suitable. Ordinarily I prefer to employ a cracking stock since, by employing a cracking stock, I am able to recover the isobutylene and to produce simultaneously extraneous quantities of olefinic material as well as gasoline components.

The amount of the hydrocarbon solvent employed will usually depend on the amount of polymer in the polymer-water emulsion. Usually it will be desirable to employ at least 50 per cent by weight, based on the polymer, of a hydrocarbon solvent. This hydrocarbon solvent should be injected into the emulsion ahead of a mixing device such as a conventional type incorporator and the mixture then passed to a settling drum or basin to which heat may be added if necessary to assist in resolving the emulsion and the heated mixture allowed to settle. The hydrocarbon solution containing the polymer rises to the top under the influence of gravity and is drawn off and routed to a cracking operation. The water is withdrawn and discharged.

At this point it may be desirable to emphasize that the emulsion of rubber polymers and water is very difficult to handle. In the afore-mentioned processing operation in which butyl rubber and the like are polymerized, it is customary to add various materials to assist in the finishing operation. One of these materials added may be a metallic stearate and the like. The tacky nature of the polymer makes it attract all sorts of foreign bodies such as dust, water, particles of iron and rust, and the like which may soon result in a heterogeneous emulsion unsusceptible to ordinary treatment such as by separation in a separator designed to effect resolution of hydrocarbon-water emulsions. The injection of hydrocarbon solvent, in accordance with the present invention, allows separation of these foreign materials, some of which are discharged with the water and the remainder separating in an interface which may be discharged separately as may be desired.

The rubber fines carried in the process water originally are dispersed as particles of varying sizes in the water. These particles vary in size from the so-called "teetering" particles which may be in the colloidal size range to agglomerates of rubber easily strainable from the aqueous dispersion. The material escaping from the straining operation comprises the polymer particles of small size and these particles of polymer form an emulsion with water as a result of traces of oily material, greases, etc. in the water flushed from the system. It is believed that traces of oily material, greases and the like are necessary to form and stabilize the emulsion which results. Other foreign bodies such as rust, dirt and the like contribute to stabilization of the emulsion. By adding large quantities of hydrocarbons to the emulsion which may be stabilized by oily material, the emulsion is resolved into its component parts.

The hydrocarbon solution containing polymer is preferably cracked under relatively mild conditions which will cause the polymer to be depolymerized to tertiary olefins and other valuable hydrocarbons without forming appreciable amounts of coke. It will be understood that either thermal or catalytic cracking may be employed to depolymerize the polymer and a wide range of temperatures may be employed; however, it will usually be desirable to conduct the cracking step at a temperature within the range of 800° to 1100 F.

The present invention will be illustrated further by reference to the single figure representing a flow diagram of one embodiment thereof.

Referring now to the drawing, numeral 11 represents a polymerization or separating zone as embodied in the so-called butyl rubber polymerization and finishing operation in which a tertiary olefin and a diolefin are polymerized and the resulting polymer dispersed in an aqueous solution for handling thereof. The water from which the major amount of rubber polymer has been removed discharges from zone 11 by way of line 12 and has injected into it by way of line 13 a hydrocarbon fraction. The emulsion of polymer and water together with the hydrocarbon solvent passes into mixing device 14 where the different components of the mixture are intimately contacted and are discharged thence by way of line 15 into heating and settling zone 16 which is a large vessel providing sufficient capacity for separation under the influence of gravity. This vessel is provided with a heating means 17 indicated by a coil.

In heating and settling zone 16 water is separated from the hydrocarbon solution of polymer and is discharged therefrom by way of line 18 and the hydrocarbon solution is removed by line 19 and discharges into cracking zone 20. Heating and settling zone 16 is provided with a third line 21 for removal of foreign bodies such as rust and metal soaps which may have been added to the rubber or which may have been picked up in the processing operation. These foreign bodies usually accumulate in the interface between the hydrocarbon solution and the water.

Cracking zone 20 may be a cracking operation of either the well known thermal type or a catalytic cracking operation. Irrespective of the type of cracking operation carried out in zone 20, it is to be understood that the conditions should be relatively mild ones designed to depolymerize the polymer and allow recovery of tertiary olefins and other valuable hydrocarbons without appreciable degradation to coke. While not shown in the drawing it is contemplated that a second feed stock may be injected into line 19 feeding into cracking zone 20.

Cracked products issue from cracking zone 20 by way of line 22 and discharge thereby into separation zone 23 which, for purpose of illustration, may be considered to be a fractionation zone or a series of fractionation zones. A fraction comprising $C_4$ and lighter hydrocarbons is removed from zone 23 by line 24, a second fraction including gasoline components discharges by line 25, and a third fraction designated as cycle oil is discharged by line 26. Tar and heavy polymers including coke-like bodies may be withdrawn by line 27.

The fraction including $C_4$ hydrocarbons discharges by line 24 into an isobutylene concentration zone 28 which may be an extraction tower, a series of such towers, or suitable fractionation equipment to allow segregation of isobutylene and separation of $C_3$ and lighter gases as well as recovery of normal butylenes and butanes. For the present purpose, it is assumed that isobutylene concentration zone 28 includes both extraction and distillation facilities for recovery of the isobutylene, normal butylenes and the butanes.

The $C_3$ and lighter hydrocarbons discharge from zone 28 by way of line 29 for any further use to which they may be put and the normal butylenes and butanes are withdrawn by line 30 for production of diolefins by dehydrogenation or for use in alkylation or isomerization reactions as may be desired. A fraction rich in isobutylene is recovered by way of line 31 and may be fed back into polymerization and separation zone 11 by way of branch line 32 or may be discharged from the system by opening valve 32 in discharge line 33. Make-up olefinic feed may be introduced into the system by opening valve 34 in line 35 connecting to line 32.

The cycle oil withdrawn from zone 23 by line 26 may be split into two portions as desired with one portion being routed through line 26, controlled by valve 37 into line 13 back to line 12 while the other portion may be recycled to the cracking operation by opening valve 38 in line 39. Optionally, the cycle oil may be recycled totally to either line 12 to serve as a solvent for resolving the emulsion or through line 39 to zone 20 to serve as a cracking stock. When the latter operation is employed it will be necessary to provide solvent from an extraneous source and this is done by opening valve 40 in line 13.

When heat is applied in heating and settling zone 16 it will be desirable not to exceed the boiling point of water. Ordinarily a temperature in the range between 150 to 190° F. will suffice.

Prior to the present invention the emulsion discarded from polymerization and separation zone 11 could not be handled in ordinary pumps and pipelines due to its viscous nature. In a commercial operation depending on flow of fluids for successful operation, it will be realized that this is a major operating obstacle. Too, the viscous, sticky nature of the polymer emulsion clogged equipment and contact surfaces employed in separating the emulsion and necessitated removal by manual methods. As pointed out before, the viscous nature of the polymer and the emulsion thereof attracts foreign bodies which contribute to the separation difficulties under ordinary conditions. In accordance with the present invention these difficulties are entirely obviated and the polymer is made available for recovery of isobutylene.

The nature and objects of the present invention having been fully described and illustrated what I wish to claim as new and useful and to secure by Letters Patent is:

1. A process for recovering valuable products from emulsions of high molecular weight isobutylene polymers and water which comprises the steps of admixing a normally liquid hydrocarbon solvent with an emulsion of a solid isobutylene polymer and water in an amount no less than approximately 50% by weight of the polymer in said emulsion, intimately contacting the mixture of solvent and emulsion and separating the mixture into a hydrocarbon phase and a water phase, discarding the water and subjecting the hydrocarbon phase to cracking and depolymerizing conditions to form light hydrocarbons, and recovering isobutylene from the light hydrocarbons.

2. A process for recovering isobutylene from emulsions of isobutylene polymers and water which comprises injecting into an emulsion of a solid isobutylene polymer and water a petroleum fraction in the gas oil boiling range in an amount no less than approximately 50% by weight of the polymer in said emulsion, intimately mixing the emulsion and the petroleum distillate to cause resolution of the emulsion into the component parts, settling the mixture, separating a water phase and a hydrocarbon phase under the influence of gravity, subjecting the hydrocarbon phase to conditions of cracking to form light hydrocarbons and recovering isobutylene from the light hydrocarbons formed in the cracking operation.

3. A process for recovering valuable products from mixtures including a solid high molecular weight isobutylene polymers and water which comprises the steps of adding a normally liquid hydrocarbon solvent to the mixture in an amount no less than approximately 50% by weight of the polymer in said mixture, intimately contacting the mixture of added hydrocarbon, isobutylene polymer, and water and allowing it to separate into a hydrocarbon phase and a water phase, discharging the water phase and subjecting the hydrocarbon phase to a heat treating operation, substantially above atmospheric temperature, to form light hydrocarbons, and recovering isobutylene from the light hydrocarbons.

4. A process in accordance with claim 3 in which the temperature of said heat treating operation is within the range of 800° to 1100° F.

PRENTISS S. VILES.

REFERENCES CITED

The following references are of record in the file of this patent:

UNITED STATES PATENTS

| Number | Name | Date |
|---|---|---|
| 1,715,217 | Woods et al. | May 28, 1929 |
| 2,104,803 | Henke et al. | Jan. 11, 1938 |
| 2,282,499 | Smeykal et al. | May 12, 1942 |
| 2,320,851 | Cramer | June 1, 1943 |
| 2,235,639 | Koch | Mar. 18, 1941 |